United States Patent [19]

Kong

[11] Patent Number: 5,201,299
[45] Date of Patent: Apr. 13, 1993

[54] ROTARY GASEOUS FUEL INJECTOR

[75] Inventor: Hakchul Kong, San Antonio, Tex.

[73] Assignee: Southwest Research Institute, San Antonio, Tex.

[21] Appl. No.: 804,994

[22] Filed: Dec. 11, 1991

[51] Int. Cl.⁵ ............................................ F02M 21/04
[52] U.S. Cl. .................................... 123/527; 123/472
[58] Field of Search ............... 123/27 GE, 525, 527, 123/472; 239/533.3, 581.1

[56] References Cited

U.S. PATENT DOCUMENTS

| | | | |
|---|---|---|---|
| 1,238,433 | 8/1917 | Pedersen . | |
| 2,571,713 | 9/1951 | Hebert | 123/527 |
| 3,216,449 | 11/1965 | Maudlin et al. | 137/599 |
| 4,416,638 | 11/1983 | Ellis | 440/88 |
| 4,430,978 | 2/1984 | Lewis et al. | 123/527 |
| 4,469,070 | 9/1984 | Rassey | 123/462 |
| 4,527,516 | 7/1985 | Foster | 123/27 GE |
| 4,673,160 | 6/1987 | Tolley | 251/129.05 |
| 4,759,331 | 7/1988 | Sausner | 123/472 |
| 5,101,794 | 4/1992 | Van Blaricom | 123/472 |
| 5,150,685 | 9/1992 | Porter et al. | 123/527 |

FOREIGN PATENT DOCUMENTS 0207171  8/1990  Japan ................................ 123/472

Primary Examiner—Willis R. Wolfe
Attorney, Agent, or Firm—Baker & Botts

[57] ABSTRACT

There is provided an electrically activated, multiple orifice rotary fuel injector for injecting gaseous fuel into an internal combustion engine. A rotary electric stepper motor is housed within an injector body which receives both air and compressed gaseous fuel. The stepper motor rotates an annular valve member to selectively permit or block fuel flow into the air stream through a plurality of circumferentially arranged holes in the valve member, and a correspondingly arranged plurality of passages in the injector body. An electronic control module on the engine utilizes pulse-width-height-triggering point modulation techniques for controlling fuel injection intervals and timing.

24 Claims, 3 Drawing Sheets

ROTARY GASEOUS FUEL INJECTOR

TECHNICAL FIELD OF THE INVENTION

The present invention generally relates to fuel injectors for internal combustion engines, and, more particularly, is concerned with an electrically activated, multiple orifice rotary fuel injector for injecting gaseous fuel into an internal combustion engine.

BACKGROUND OF THE INVENTION

Internal combustion engines have traditionally been fueled by liquid hydrocarbon fuels, such as gasoline and diesel fuel. However, $NO_X$ and particulate emissions generated by the use of these fuels contributes significantly to air pollution. Environmental concerns therefore require the development of internal combustion engines that operate with cleaner burning fuels. Natural gas and other gaseous fuels have been found to produce significantly lower undesirable emissions than liquid hydrocarbon fuels.

However, because of their much lower densities, gaseous fuels must be delivered to the engine at volume flow rates significantly higher than liquid fuels. In addition, the flow rate of a gaseous fuel must be precisely controlled to achieve proper engine performance, low exhaust emissions, and good fuel economy. Existing carburetors and fuel injectors designed for liquid fuels are not capable of delivering gaseous fuels at the required flow rates, and with the needed degree of precision.

Several attempts have been made to develop a fuel delivery device for delivering gaseous fuels to internal combustion engines. One of such devices is a modified version of an automotive gasoline fuel injector. This modified fuel injector employs a linear solenoid actuated valve, similar in principal to those in gasoline injectors, but the valve orifice is made much larger to accommodate the higher flow rate. Another such device is a mechanical gas mixer.

While these prior devices have been used to a limited degree with gaseous fuels, they suffer from several inherent disadvantages. The linear solenoid actuated injector is incapable of opening and closing its large valve orifice fast enough, and thus of controlling fuel delivery accurately enough, for optimum fuel economy and engine performance. The turn-down ratio of this injector is not wide enough to optimally control the fuel/air ratio over an automotive engine's full operating range. At gaseous fuel pressures higher than approximately 300 psi, instability in the fuel/air ratio delivered by this injector is likely to occur due to rapid close-opening cycles and the high pressure gas. An instability in pressure causes fluctuations in the gas density, which in turn causes fluctuations in fuel/air ratio and high exhaust emissions. It is also difficult to achieve good fuel/air mixing with the large valve in a linear solenoid actuated injector. With mechanical gas mixers, it is very difficult to adjust and control fuel/air ratio, and, thus, to achieve optimum engine performance and fuel economy. Further, there is the potential for explosion in the fuel intake system with a gas mixer.

Consequently, a need exists for an improved apparatus for properly mixing a gaseous fuel with air, and for accurately delivering the fuel/air mixture to an internal combustion engine at the required flow rate.

SUMMARY OF THE INVENTION

This invention is an electrically activated, multiple orifice rotary fuel injector for injecting gaseous fuel into an internal combustion engine having a fuel injection controller, a gaseous fuel supply, and a fuel supply conduit connecting the fuel supply with the engine. The fuel injector comprises an injector body including a bore extending therethrough, a chamber formed therein, passage means therein connecting the chamber with the bore, and an inlet port connected to the chamber and connectable to the fuel supply conduit for supplying the fuel to the chamber. The injector further comprises a valve member located in the injector body for movement between a first position blocking the flow of fuel from the chamber to the bore through the passage means, and a second position permitting the flow of fuel therethrough. The injector also comprises actuating means responsive to the fuel injection controller for selectively moving the valve member between the first and second positions.

The passage means in the injector body comprises a plurality of circumferentially spaced passages opening into the chamber. The valve member includes an annular flange, the flange having a plurality of correspondingly arranged holes aligning with the passages to permit fuel flow when the valve member is moved into its second position, and blocking fuel flow when the valve member is moved into its first position. The actuating means is a rotary electric solenoid or stepper motor, which is controlled by the fuel injection controller using pulse-width-height-triggering point modulation techniques.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
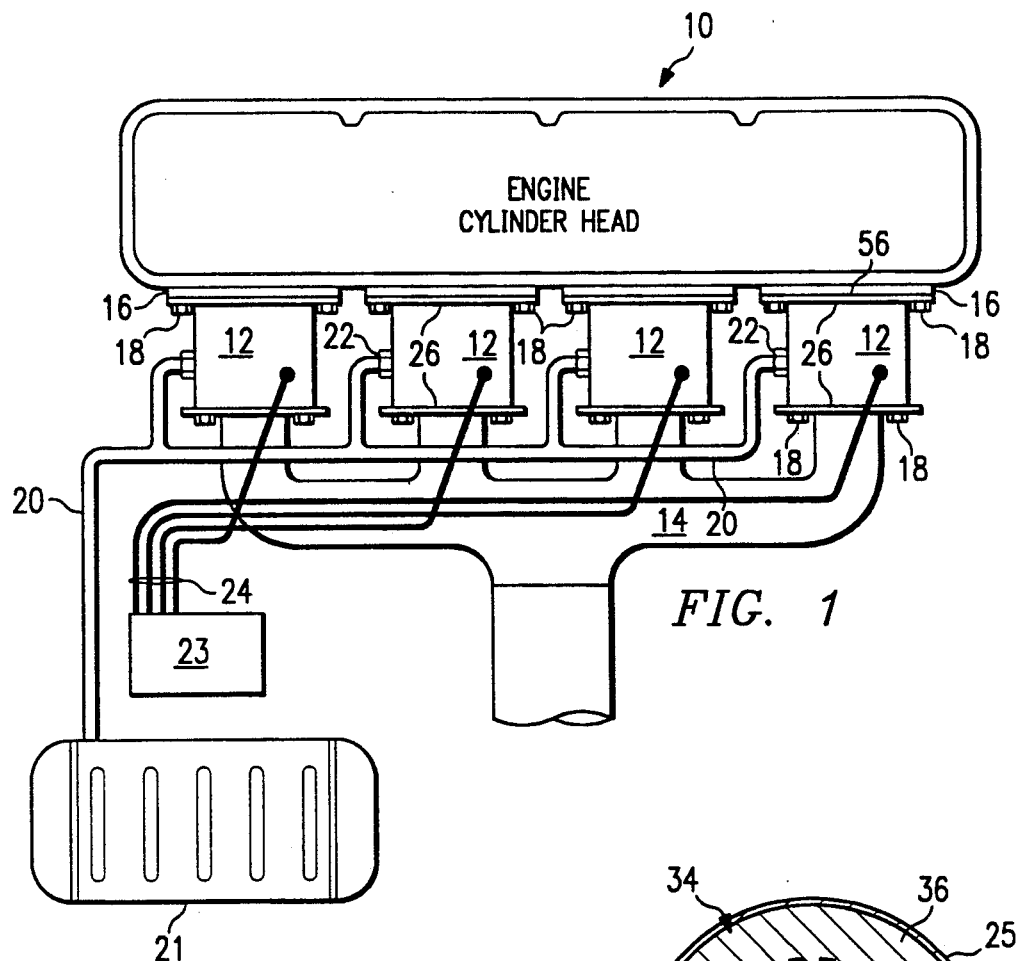
FIG. 1 is a plan view of an internal combustion engine equipped with fuel injectors of this invention.

The preferred embodiment of the present invention and its advantages are best understood by referring to the drawings, like numerals being used for like and corresponding parts of the various drawings.

In FIG. 1 there is shown an internal combustion engine 10 equipped with fuel injectors 12 of the present invention. A separate injector 12 is provided for each cylinder of engine 12. Although a four cylinder engine 10 is illustrated, the fuel injector 12 of this invention can be used with an engine 10 having any number of cylinders.

Each fuel injector 12 is attached to engine 10 at a respective cylinder (not illustrated). An insulator 16 is preferably located between each injector 12 and engine 10 for insulating injector 12 from the high operating temperatures of engine 10. Insulators 16 are preferably composed of bakelite material. Injectors 12 are attached to engine 10 by any suitable means, such as by mechanical fasteners 18. A fuel supply conduit 20 leads from a fuel supply or tank 21 to an inlet port 22 on each injector 12. Each injector 12 is electrically connected to a fuel injection controller or electronic control module 23 by suitable control wiring 24.

Figure 3:
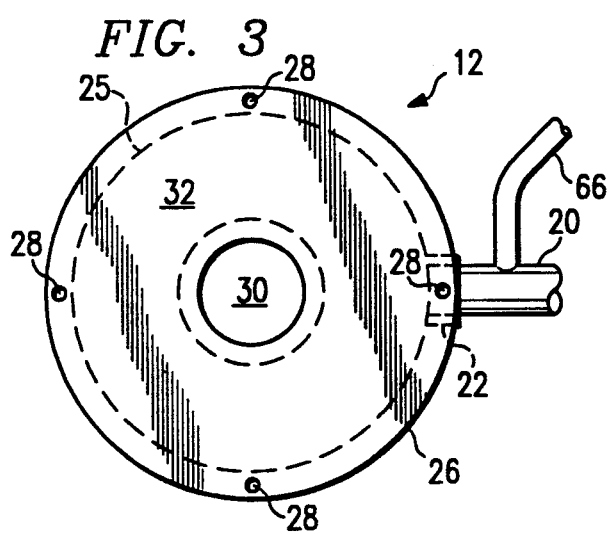
FIG. 3 is an elevational view of the inlet end of the injector, taken along line 3—3 in FIG. 2.
Figure 2:
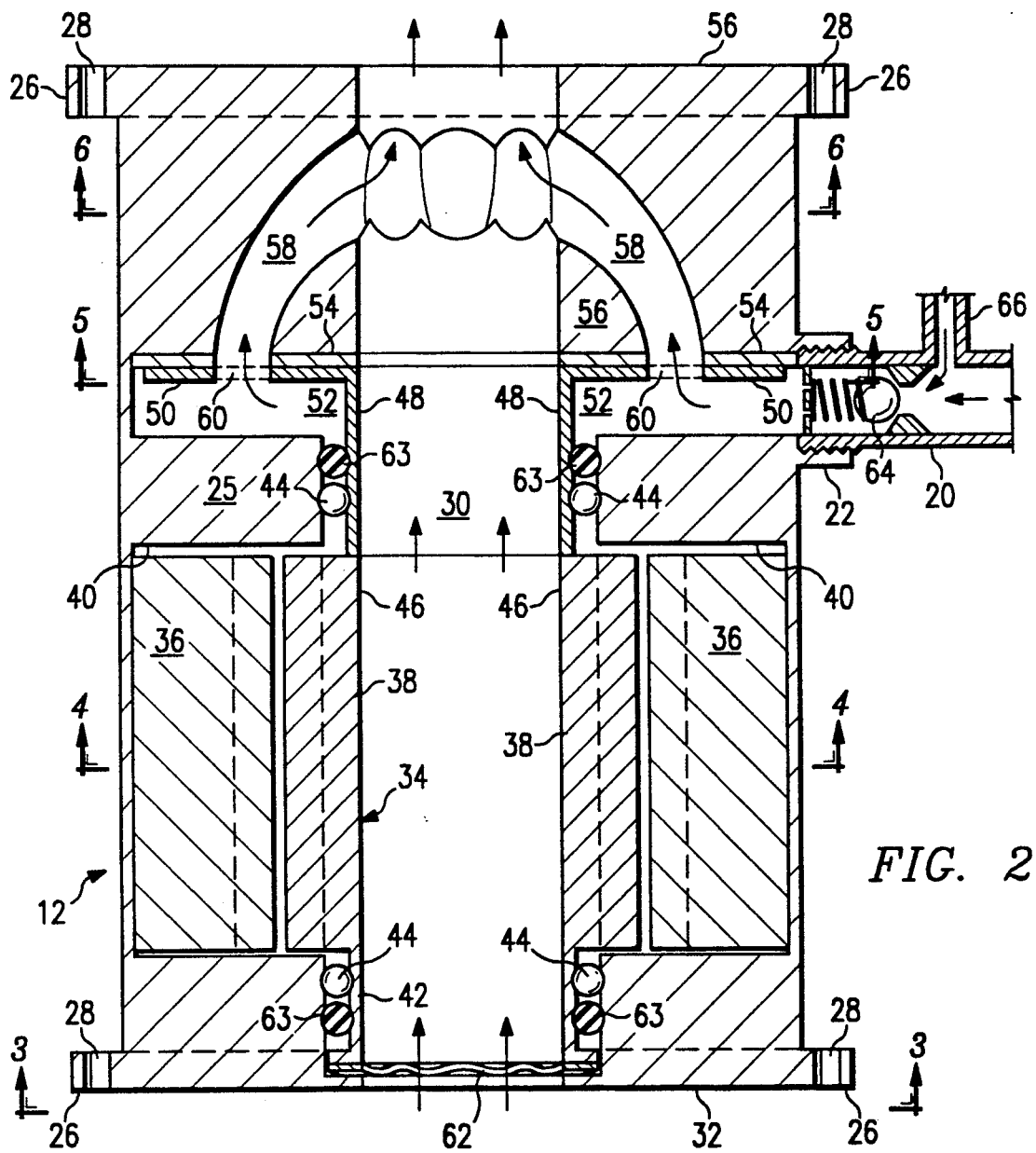
FIG. 2 is a cross sectional view of a preferred embodiment of the fuel injector of this invention, taken along the longitudinal axis of the injector body.

Referring now to FIGS. 2 and 3, the body 25 of each fuel injector 12 is generally cylindrical in shape, and has a flange 26 projecting from each end. Each flange 26 is provided with a plurality of holes 28 for receiving mechanical fasteners 18. A bore 30 extends through the center of injector 12.

Figure 4:
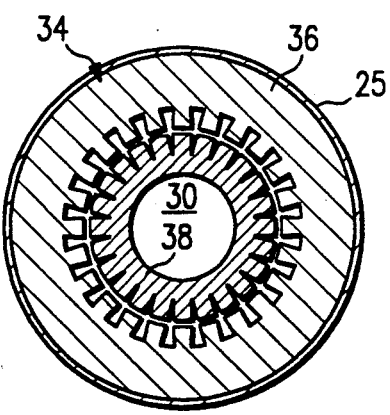
FIG. 4 is a cross sectional view taken along line 4—4 in FIG. 2, showing the primary components of the stepper motor.

Referring now to FIG. 2, the inlet side 32 of injector 12 contains an actuating means or a rotary electric stepper motor 34. Motor 34 consists of a fixed excitation stator 36, and a rotatable reluctance rotor 38. Stator 36 is generally cylindrical in shape, and is fitted within a similarly shaped cavity 40 within the body of injector 12. As best seen in FIG. 4, rotor 38 is generally tubular in shape and is fitted for rotational movement within stator 36. The inner diameter of rotor 38 approximately equals the diameter of bore 30 in the body 25 of injector 12. Referring again to FIG. 2, the inlet end 42 of rotor 38 is supported by a plurality of ball bearings 44, which are located between inlet end 42 of rotor 38 and injector body 25.

Figure 5:
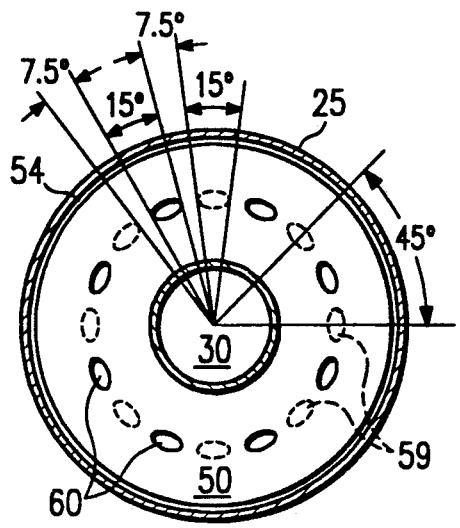
FIG. 5 is a cross sectional view taken along line 5—5 in FIG. 2, showing the plurality of holes in the valve member flange.

As seen in FIG. 2, extending from the outlet end of rotor 46 is a tubular shaped valve member 48. Valve member 48 includes at its outlet end an annular flange 50. Flange 50 of valve member 48 fits within an annular chamber 52 which encircles bore 30 within injector body 25. Flange 50 slidably engages an annular seat surface 54 of chamber 52. The outlet side 56 of injector body 25 has formed in it passage means comprising a plurality of circumferentially spaced passages 58 connecting chamber 52 with bore 30. Passages 58 open into chamber 52 through respective orifices 59 in annular seat surface 54. Flange 50 on valve member 48 contains a plurality of holes 60 correspondingly arranged with the plurality of orifices 59. FIG. 5 illustrates the arrangements of the plurality of holes 60 in valve flange 50 and the plurality of orifices 59 in annular seat surface 54. Preferably, there are 8 holes 60 in valve flange 50, and 8 passages 58 in injector body 25. The holes 60 and orifices 59 are preferably equally spaced, with 45° angles between adjacent holes 60 or orifices 59, respectively.

Figure 6:
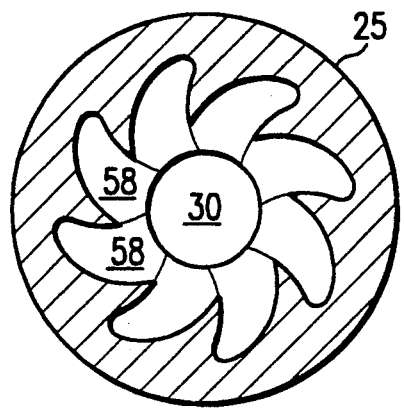
FIG. 6 is a cross sectional view taken along line 6—6 in FIG. 2, showing the swirl passages in the injector body.

As best seen in FIG. 6, passages 58 are not radially directed toward the axis of injector body 25, but are spirally shaped toward its axis, so as to impart a vortex flow component to gaseous fuel flowing through passages 58. Both flange 50 and the annular seat surface 54 are preferably composed of ceramic material. Valve member 48 is supported within injector body 25 by a plurality of ball bearings 44.

Referring again to FIG. 2, an annular spring 62 interposed between rotor 38 and the inlet end 32 of injector body 25 urges valve member flange 50 against annular seat surface 54 to form a seal therebetween. Annular seals 63 between injector body 25 and valve member 48 and between injector body 25 and rotor 38 prevent leakage therebetween. A check valve 64 is located in inlet port 22 to prevent backflow of fuel from the injector 12 into fuel supply conduit 20. Preventing fuel backflow is instrumental in preventing backfire through injector 12. An oil vapor supply conduit 66 connects fuel supply conduit 20 with the positive crankcase ventilation system (not shown) of engine 10. Stepper motor 34 is electrically connected to the electronic control module 23 of engine 10, as shown in FIG. 1.

Fuel injector 12 injects and mixes gaseous fuel with air flowing through bore 30 of injector 12. In operation, the chamber 52 is continuously supplied with pressurized fuel from fuel tank 21 through fuel supply conduit 20 and fuel injection occurs during a precisely controlled time interval, once for each two revolutions of the engine 10 crankshaft. The timing and duration of the fuel injection interval, and the response time of the injector, are individually controlled by the electronic control module 23. Module 23 employs on-off, pulse width modulation or, preferably, pulse-width-height-triggering point modulation control, which is graphically illustrated in FIGS. 7 and 8.

Figure 7:
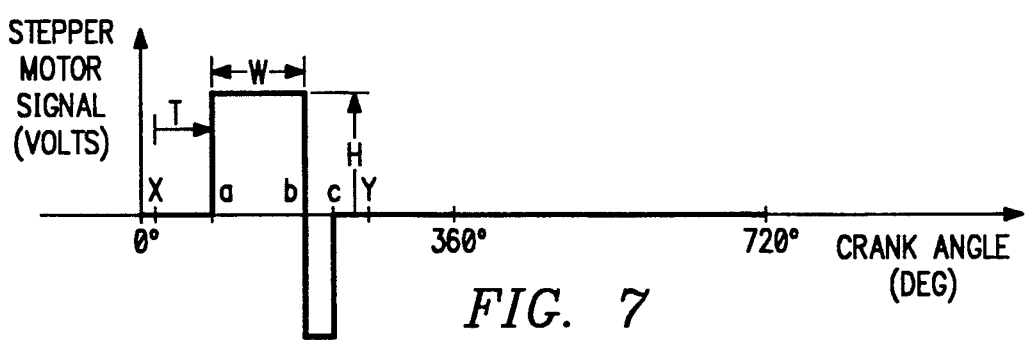
FIG. 7 is a graph depicting the wave-form of the control signal applied to the stepper motor as a function of crankshaft angular displacement.
Figure 8:
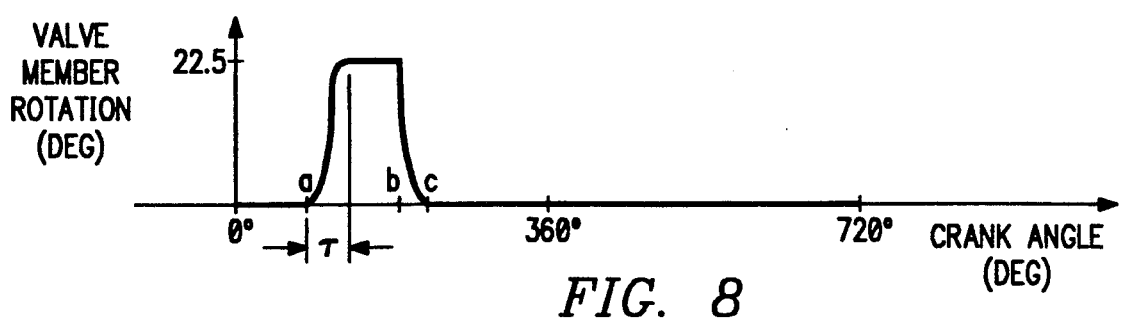
FIG. 8 is a graph depicting the angular rotation of the valve member in response to a control signal applied to the stepper motor, as a function of crankshaft angular displacement.

Referring to FIG. 7, Voltage H, after triggering time interval T, which is measured from the time of intake valve opening or piston top dead center x, is applied to stepper motor 34. Point a denotes the time, or crank angle, at which Voltage H is applied. Voltage H energizes rotor 38, causing rotor 38 and valve member 48 to rotate 22.5°, thus moving holes 60 in valve member flange 50 into alignment with orifices 59 in annular seat surface 54. Pressurized fuel is thus permitted to flow from chamber 52 into the air passing through injector bore 30. Passages 58 are spiral shaped to impart a vortex flow component to the fuel to promote complete mixing with the air, and optimum combustion efficiency. The duration of the fuel injection interval is controlled by the duration or pulse width W of the voltage pulse H. Referring to FIG. 8, the response time $\tau$ of the injector 12, being the time required for valve member 48 to rotate in response to a voltage pulse, is controlled by the amplitude of the voltage pulse H, as illustrated in FIG. 7.

At the end of a fuel injection interval, the valve member 48 is rotated 22.5° back to its starting position, which moves holes 60 in flange 50 out of alignment with orifices 59 in annular seat surface 54, to block fuel flow through the injector. The reverse rotation of valve member 48 can be accomplished in one of two ways. Referring to FIG. 7, the valve member 48 can be returned by applying to stepper motor 34 a voltage pulse of opposite polarity to that of the initial, energizing pulse H. This homing or return voltage pulse, occurring between points b and c in FIG. 7, is preferably of equal amplitude to the initial pulse H, but of shorter duration.

Figure 2A:
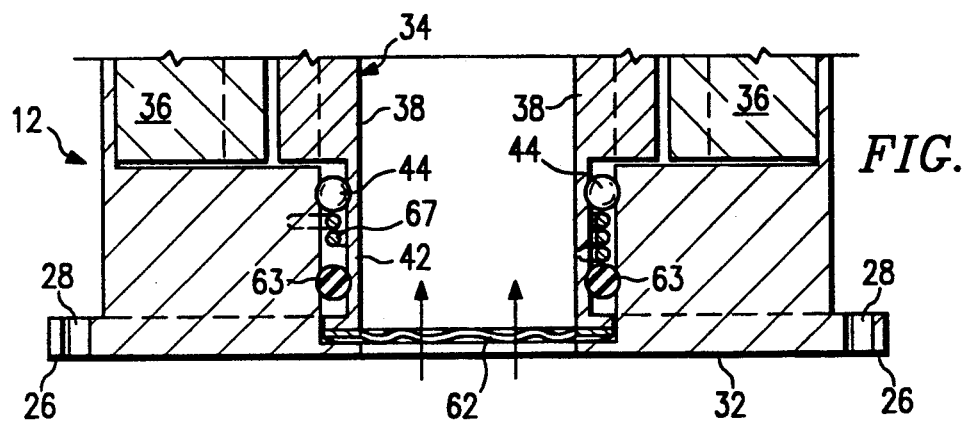
FIG. 2A is a fragmentary cross-sectional view of an alternative embodiment of the fuel injector of this invention, taken along the longitudinal axis of the injector body.

For time reference purposes, point y denotes the time or crank angle of engine intake valve closing. Alternatively, valve member 48 can be returned to its initial position to block fuel flow by a torsional spring 67 connected at one end to rotor 34 and at the other end to injector body 25, as illustrated in FIG. 2A, for urging valve member 48 into its returned position. In this case, an appropriate stop will be included on valve member 48 or rotor 38 to prevent over-rotation of valve member 48 beyond its initial position.

Referring again to FIG. 2, the fuel entering fuel injector 12 is supplied with oil vapor from the engine's positive crankcase ventilation system through oil vapor supply conduit 66 connected to fuel supply conduit 20. The oil vapor is introduced both to lubricate the sliding surfaces of flange 50 and annular seat surface 54, and also to provide a damping media to moving components of the fuel injector. Check valve 64 within inlet port 22 serves two functions. First, it prevents backflow of fuel from fuel injector 12 into fuel supply conduit 20 for safety in the case of backfire. Second, it acts as a mixing device for mixing the oil vapor introduced through oil vapor supply conduit 66 with the fuel entering fuel injector 12.

Several advantages and attainments over prior devices are realized by the gaseous fuel injector of this invention. First, the timing and quantities of fuel injected into the engine are highly and precisely controlled by the wave form applied to the stepper motor, resulting in reduced emissions, improved fuel economy, and better engine performance. Second, the fuel injector of this invention easily accommodates the large volume flow rate required for low pressure gaseous fuels, yet without sacrificing precision of control in fuel delivery. Third, the potential for explosion with previous devices is eliminated. Fourth, the fuel injector of this invention is compatible with vehicular electronic control modules presently available. Fifth, fuel/air mixing is more thoroughly accomplished. Sixth, the turn-down ratio of this injector is wide enough to accurately control the fuel/air ratio over the entire operating range of the engine. Seventh, the fuel/air ratio delivered by this injector is stable over the entire operating range. Finally, the injector of this invention is adaptable for use as either a port or throttle body fuel injector on vehicular engines.

The rotary gaseous fuel injector of the present invention, and many of its intended advantages, will be understood from the foregoing description, and it will be apparent that, although the invention and its advantages have been described in detail, various changes, substitutions, and alterations may be made in the manner, procedure, and details thereof without departing from the spirit and scope of the invention, as defined by appended claims, or sacrificing all of its material advantages, the form hereinbefore described being merely a preferred or exemplary embodiment thereof.

What is claimed is:

1. A fuel injector for injecting gaseous fuel into an internal combustion engine having a fuel injection controller, a gaseous fuel supply, and a fuel supply conduit connecting the fuel supply with the engine, the fuel injector comprising:

an injector body including a bore extending therethrough, a chamber formed therein, passage means therein connecting the chamber with the bore, and an inlet port connected to the chamber and connectable to the fuel supply conduit for supplying the fuel from the fuel supply to the chamber;

a valve member located in the injector body for movement between a first position blocking the flow of fuel from the chamber to the bore through the passage means, and a second position permitting the flow of fuel therethrough; and actuating means responsive to the fuel injection controller for selectively moving the valve member between the first and second positions.

2. The fuel injector of claim 1, wherein:

the chamber is annular and encircles the bore;

the passage means in the injector body comprises a plurality of circumferentially spaced passages opening into the chamber; and the valve member includes an annular flange, the flange having a plurality of correspondingly arranged holes aligning with the passages to permit fuel flow when the valve member is moved into its second position, and blocking fuel flow when the valve member is moved into its first position.

3. The fuel injector of claim 2, wherein the circumferentially spaced passages are shaped so as to impart a vortex flow component to gaseous fuel flowing therethrough, for promoting mixture of the fuel with air within the injector body bore.

4. The fuel injector of claim 2, wherein the chamber in the injector body has an annular seat surface, and further including biasing means associated with the valve member for urging the valve member flange against the annular seat surface for forming a seal therebetween.

5. The fuel injector of claim 4, wherein the biasing means is an annular spring interposed between the valve member and the injector body.

6. The fuel injector of claim 4, wherein the annular seat surface and the valve member flange are composed of ceramic material.

7. The fuel injector of claim 1, wherein the actuating means is a rotary electric stepper motor.

8. The fuel injector of claim 7, wherein the stepper motor comprises a rotor attached to the valve member, and a stator fixed relative to the injector body.

9. The fuel injector of claim 8, wherein the rotor is generally tubular in shape for permitting the flow of fluid therethrough.

10. The fuel injector of claim 9, wherein the stator is generally cylindrical in shape, and is positioned within the injector body encircling the rotor.

11. The fuel injector of claim 1, wherein the fuel injection controller is an electronic control module.

12. The fuel injector of claim 11, wherein the electronic control module utilizes pulse width modulation for controlling fuel injection intervals.

13. The fuel injector of claim 11, wherein the electronic control module utilizes pulse-width-height-triggering point modulation for controlling fuel injection intervals, valve member actuation response time, and fuel injection timing relative to engine ignition timing.

14. The fuel injector of claim 12, wherein the valve member is moved from its first position to its second position permitting fuel flow through the injector by applying a first signal to the stepper motor, and is moved from its second position to its first position blocking fuel flow by applying a second signal having a polarity opposite that of the first signal.

15. The fuel injector of claim 12, wherein the valve member is moved from its first position to its second position permitting fuel flow through the injector by applying a signal to the stepper motor, and is moved from its second position to its first position blocking fuel flow by a torsional spring.

16. The fuel injector of claim 13, wherein the valve member is moved from its first position to its second position permitting fuel flow through the injector by applying a first signal to the stepper motor, and is moved from its second position to its first position blocking fuel flow by applying a second signal having a polarity opposite that of the first signal.

17. The fuel injector of claim 13, wherein the valve member is moved from its first position to its second position permitting fuel flow through the injector by applying a signal to the stepper motor, and is moved from its second position to its first position blocking fuel flow by a torsional spring.

18. The fuel injector of claim 1, further including means for preventing backflow of fuel from the injector into the fuel supply conduit.

19. The fuel injector of claim 18, wherein the means for preventing backflow comprises a check valve located in the inlet port of the injector body.

20. The fuel injector of claim 1, further including a plurality of bearings located between the rotor and the injector body for reducing the friction associated with movement of the valve member between the first and second positions.

21. In a gaseous fueled internal combustion engine having a gaseous fuel supply, a fuel supply conduit connecting the fuel supply with the engine, a crankcase, and a positive crankcase ventilation system for venting oil vapor from the crankcase, an improved fuel supply system comprising:
   an injector body including a bore extending therethrough, a chamber formed therein, passage means therein connecting the chamber with the bore, and an inlet port connected to the chamber and connectable to the fuel supply conduit for supplying the fuel from the fuel supply to the chamber;
   a valve member located in the injector body for movement between a first position blocking the flow of fuel from the chamber to the bore through the passage means, and a second position permitting the flow of fuel therethrough;
   actuating means responsive to the fuel injection controller for selectively moving the valve member between the first and second positions; and
   means for conveying oil vapor from the positive crankcase ventilation system into the fuel supplied to the inlet port of the injector body.

22. The improved fuel supply system of claim 21, wherein the means for conveying oil vapor into the fuel is a conduit leading from the positive crankcase ventilation system to the fuel supply conduit.

23. A fuel injector for injecting gaseous fuel into an internal combustion engine having a fuel injection controller, a gaseous fuel supply, and a fuel supply conduit connecting the fuel supply with the engine, the fuel injector comprising:
   an injector body including a bore extending therethrough, an annular chamber encircling the bore and having a seat surface; a plurality of circumferentially spaced passages connecting the chamber with the bore, and an inlet port connected to the chamber and connectable to the fuel supply conduit for supplying fuel from the fuel supply to the chamber;
   a valve member located in the injector body for movement between a first position blocking the flow of fuel from the chamber to the bore through the passages, and a second position permitting the flow of fuel therethrough;
   an annular flange on the valve member having a plurality of holes correspondingly arranged to the passages in the injector body, for aligning with passages to permit fuel flow when the valve member is moved into its second position, and for blocking fuel flow when the valve member is moved into its first position;
   actuating means responsive to the fuel injection controller for selectively moving the valve member between the first and second positions;
   biasing means associated with the valve member for urging the flange against the seat surface of the annular chamber for forming a seal therebetween;
   a check valve located in the inlet port of the injector body for preventing backflow of fuel from the injector into the fuel supply conduit; and
   a plurality of bearings located between the valve member and the injector body for reducing the friction associated with movement of the valve member between the first and second positions.

24. The fuel injector of claim 23, wherein the injector body contains 8 passages connecting the chamber with the bore;
   the annular flange on the valve member has 8 correspondingly arranged holes; and
   the actuating means rotates the valve member 22.5° between the first and second positions.

* * * * *